Dec. 15, 1959    J. W. BLOOM ET AL    2,917,107
FOLDING ARM REST

Filed Dec. 10, 1956    3 Sheets-Sheet 1

INVENTORS
John W. Bloom, &
BY Basil Brubaker
W. S. Pettigrew
ATTORNEY

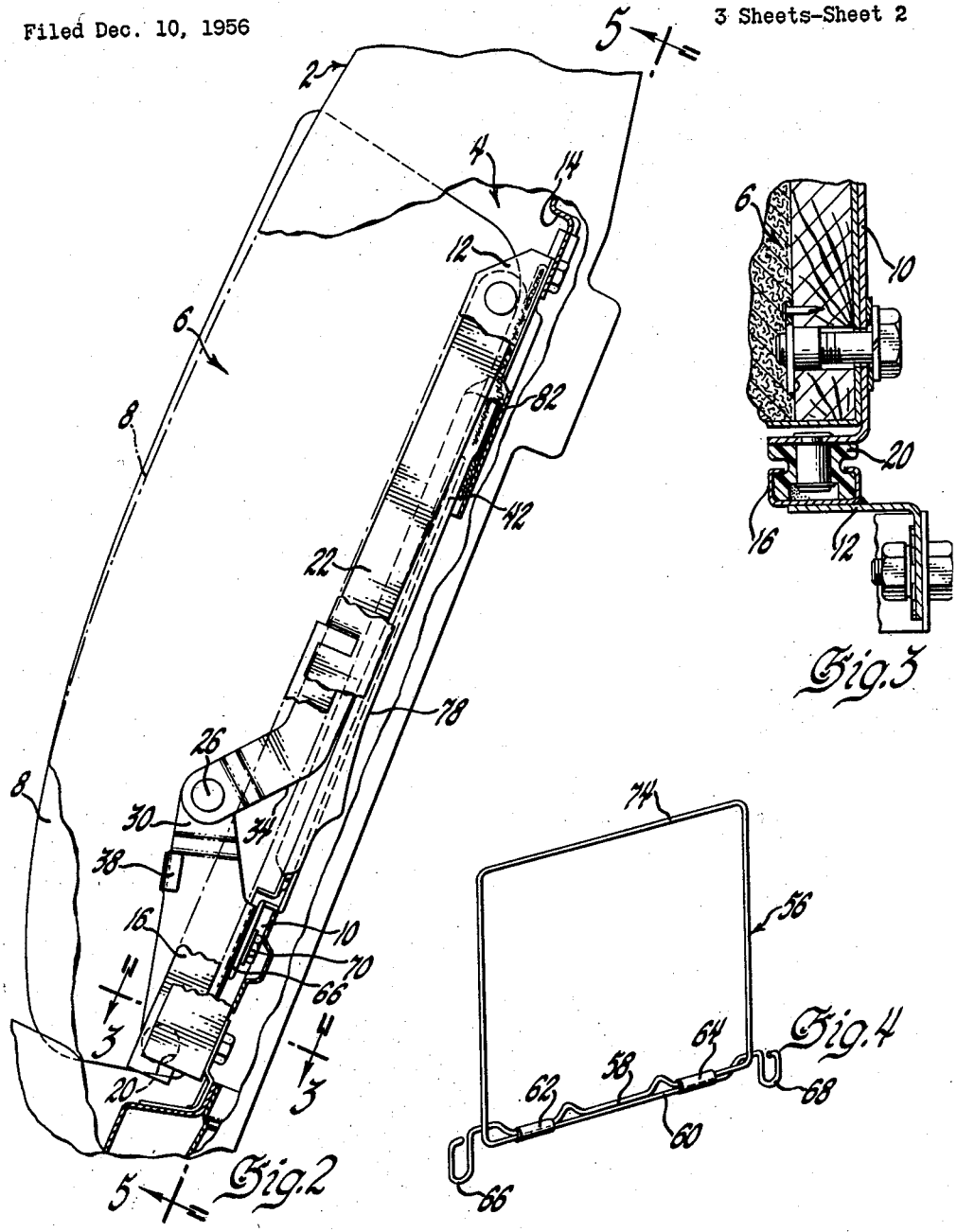

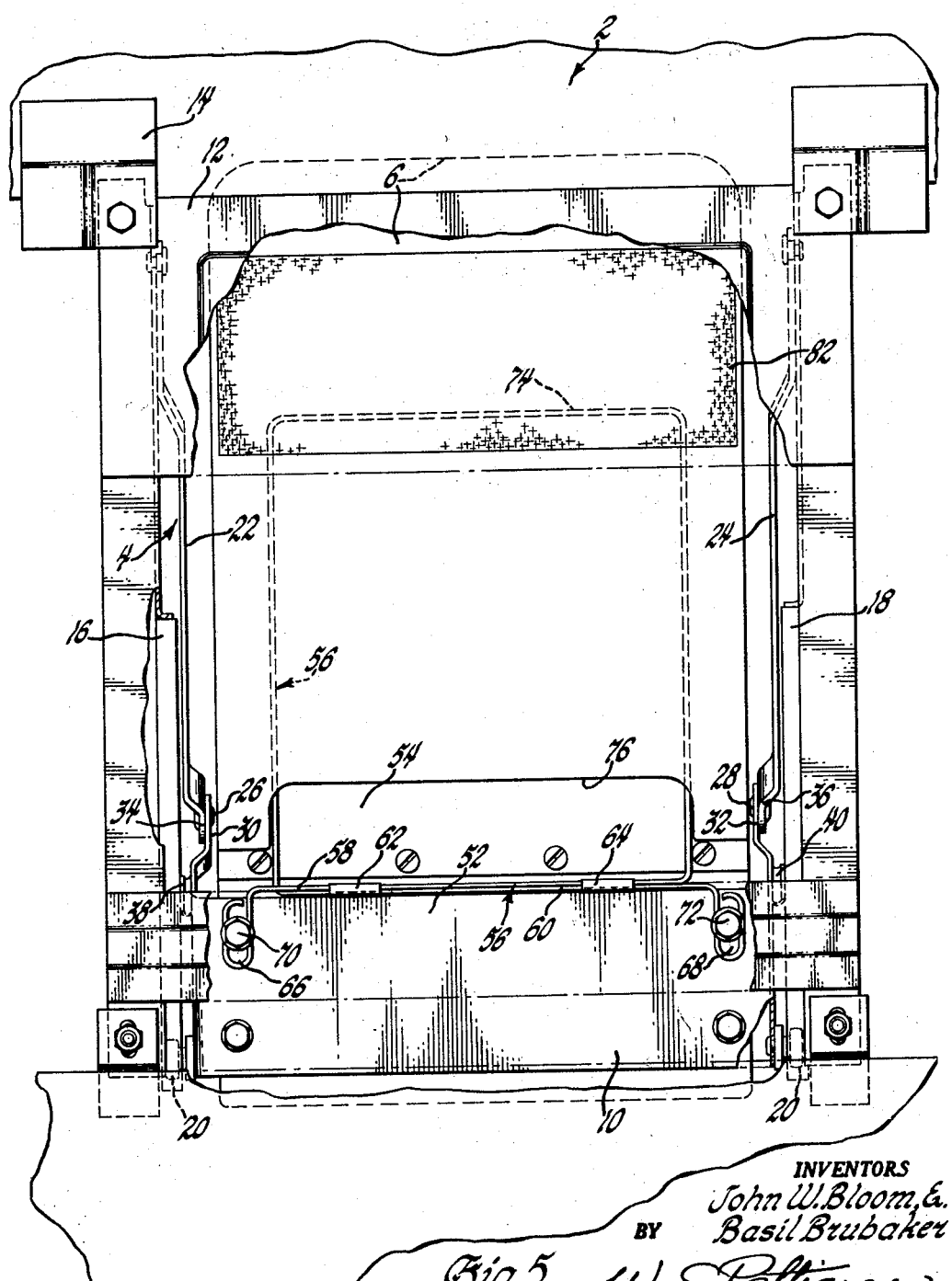

United States Patent Office 2,917,107
Patented Dec. 15, 1959

2,917,107

FOLDING ARM REST

John W. Bloom and Basil Brubaker, Detroit, Mich., assignors to General Motors Corporation, Detroit, Mich., a corporation of Delaware Application December 10, 1956, Serial No. 627,481

2 Claims. (Cl. 155—112)

This invention relates to arm rests and more particularly to retractable center arm rests for vehicle seats.

It is well known in the prior art to provide vehicle seat center arm rests which normally occupy a notched recess in the seat back and are swingably extensible to a horizontal arm supporting position. In general, when arm rests of this type are in the arm supporting position the upper portion of the notched recess in the seat back is exposed, thereby presenting an unsightly appearance.

An object of the present invention is to provide an improved arm rest construction.

Another object is to provide an arm rest construction incorporating an auxiliary trim pad which is adapted to mask the portion of the seat back notch exposed when the arm rest is lowered to arm supporting position.

A further object is to provide an arm rest construction of the stated character including a simplified masking structure and automatic actuating means therefor.

These and other objects, advantages and features of the invention will become more fully apparent as reference is had to the accompanying specification and drawings wherein:

Fig. 2 is an enlarged fragmentary side elevational view, partly in section and with parts broken away, depicting the arm rest in the retracted position.

Fig. 3 is an enlarged fragmentary sectional view looking in the direction of arrows 3—3 of Fig. 2.

Fig. 4 is an enlarged perspective view of the torsional spring member utilized to automatically actuate the auxiliary trim mask associated with the arm rest; and Fig. 5 is an enlarged fragmentary view, partly in section, looking in the direction of arrows 5—5 of Fig. 2.

Figure 1:
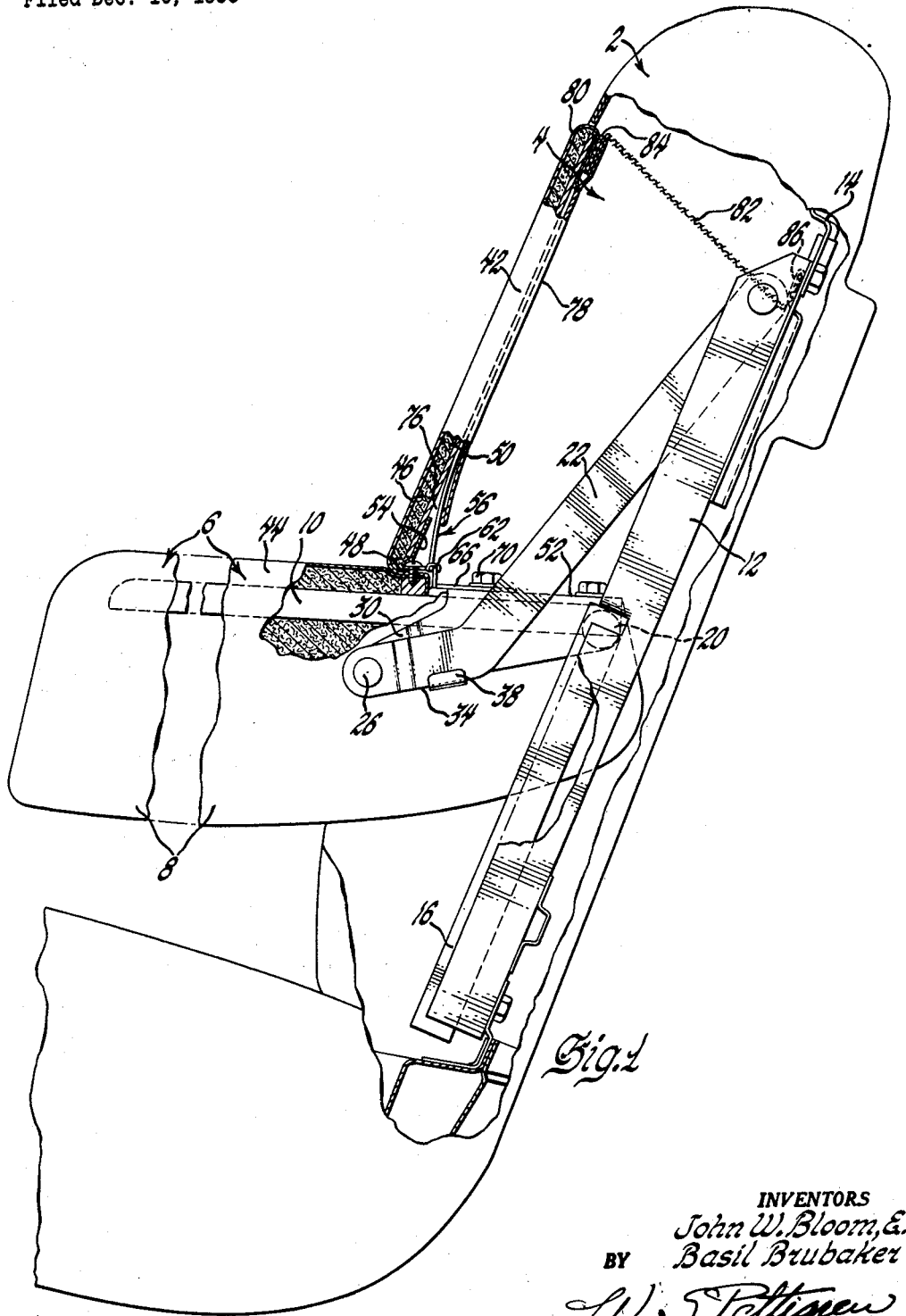
Fig. 1 is a fragmentary side elevational view of a vehicle seat illustrating the construction of the invention and its relation to the seat when in extended position, certain parts being broken away and in section.

Referring now to the drawings and particularly Figs. 1 and 2, there is illustrated a vehicle seat in which the reference numeral 2 designates generally the transversely extending vertical seat back cushion. Back cushion 2 is constructed in the usual manner and is provided with suitable fabric upholstery. Transversely centrally thereof, cushion 2 is provided with a recess or inset pocket 4 of generally rectangular configuration which is adapted to receive an arm rest structure 6 of substantially corresponding dimensions. Arm rest 6 is preferably fashioned and trimmed so that the frontal surface 8 thereof (Fig. 2) merges with the adjacent frontal surface of cushion 2. Disposed interiorly of arm rest 6 is an elongated frame 10, the rearward end of which is adapted for pivotal connection to an auxiliary frame structure 12 which, in turn, is rigidly mounted on the seat back frame 14 at the rearward extremity of the notched recess 4. As seen best in Fig. 5, auxiliary frame 12 is generally rectangular in shape and has rigidly connected thereto a pair of transversely spaced generally vertically extending U-shaped guide tracks 16 and 18 which are adapted to receive spool-type rollers 20. Rollers 20, in turn, are rotatably connected to the rearward end of arm rest frame 10, respectively, at its lateral opposite sides. Near its upper extremity auxiliary frame 12 has pivotally connected thereto a pair of transversely spaced depending links 22 and 24, the lower bent ends of which are pivotally connected at 26 and 28 to depending forwardly extending legs 30 and 32 formed respectively at the lateral opposite sides of frame 10. In operation, when arm rest 6 is lowered from the recessed position shown in Fig. 2 to the arm supporting position shown in Fig. 1, roller elements 20 travel vertically in guide tracks 16 and 18 as the arm rest 6 pivots about the axis defined by pivots 26 and 28. When the lower edges 34 and 36 of the lower bent ends of links 22 and 24 abut U-shaped stop members 38 and 40 formed integrally on legs 30 and 32, further downward swinging movement of arm 6 is prevented thereby establishing and rigidly maintaining the latter in a horizontal arm supporting position.

As will be evident from Fig. 1, when arm rest 6 is in the horizontal arm supporting position, a relatively large proportion of the notched recess 4 formerly occupied by the arm rest is exposed. In order to eliminate the unsightly appearance occasioned by withdrawal of the arm rest from its retracted position in accordance with the present invention, a generally rectangular fabric covered trim pad 42 is secured on the top surface 44 of the arm rest substantially midway between the opposite ends thereof in a manner permitting swingable movement about the axis transverse thereto. In the embodiment shown, the hinge for trim pad 42 is provided by extending the forward fabric layer 46 beyond the lower extremity 48 of trim board 50 and clamping the extended fabric portion between the top wall 52 of arm rest frame 10, and an angle plate 54 threadably secured thereto.

In order to automatically align trim pad 42 in the proper angular position over the mouth of recess 4 when arm rest 6 is withdrawn, there is provided a one-piece torsion spring 56. As seen best in Fig. 4, torsion spring 56 is a generally rectangular wire spring having oppositely extending lower arms 58 and 60 which are arranged in generally parallel relation. Arms 58 and 60 are maintained in their related position by means of a pair of spaced tubular clips 62 and 64. At their terminal extremities, arms 58 and 60 are formed with looped attaching portions 66 and 68, respectively, which are adapted for connection, by means of screws 70 and 72, to the top wall 52 of arm rest frame 10 rearwardly of trim pad 42. Before attachment of spring 56, the upper rectangular portion 74 thereof is slidably inserted into a sleeve recess 76 formed between the back wall of trim board 50 and the rear fabric layer 78. In assembled position spring 56 is torsionally loaded sufficiently to urge trim pad 42 counterclockwise to a position flush with the fabric covered arm engaging portion 44 of arm rest 6. However, as arm rest 6 is withdrawn from notch 4, trim pad 42 may move forwardly therewith only until the upper edge 80 of pad 42 moves to a position flush with the mouth of notch 4. At this point, further swinging movement of pad 42 with arm rest 6 is restrained by a fabric link 82 connected between the upper rear edge 84 of pad 42 and the upper edge 86 of auxiliary frame 12, the fabric link 82 being adjusted between the end of pad 42 and the auxiliary frame 12 so that the pad or panel 42 resists movement forwardly after the latter has moved to a position generally flush with the mouth of the recess 4 upon the withdrawal of the arm rest 6 therefrom.

From the foregoing it will be seen that an auxiliary trim pad constructed in accordance with the present invention will lie in flush relation with the top wall of the arm rest when the latter is in recessed position and is automatically movable to a recess masking position upon lowering of the arm rest to an arm supporting position. Because of the improved and simplified construction of spring 56, automatic operation of trim pad 42 is not only efficient and dependable, but in addition substantial simplification in general complexity of structure is accomplished, resulting in significant reduction in time required for assembly.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. In combination a vehicle seat comprising a seat back having a forwardly facing recess formed therein, an arm rest pivoted on said back and movable from a recess-occupying position to a horizontal arm-supporting position, a trim panel having a lower flexible edge providing a hinged attachment with the upper portion of said arm rest, a flexible link connected between the upper end of said panel and the base of said recess, said link being adjusted to limit forward movement of said panel so as to position the latter flush with the mouth of said recess upon withdrawal of said arm rest therefrom, and a generally rectangular wire spring serving to resiliently urge said panel forwardly relative to said arm rest and counter-clockwise about said hinged attachment means, said spring having oppositely bent generally parallel arms disposed in side-by-side relationship and terminating in looped portions attached to said arm rest.

2. In combination a vehicle seat comprising a seat back having a forwardly facing recess formed therein, an arm rest pivoted on said back and movable from a recess-occupying position to a horizontal arm-supporting position, a trim panel having the outer face thereof covered with fabric, the lower portion of said fabric providing a hinged attachment with the upper wall of said arm rest, a pocket in the inner face of said panel, a flexible link connected between the upper end of said panel and the base of said recess, said link being adjusted to limit forward movement of said panel so as to position the latter flush with the mouth of said recess upon withdrawal of said arm rest therefrom, a generally rectangular wire spring serving to resiliently urge said panel forwardly relative to said arm rest, said spring including a generally rectangular main body portion accommodated in said pocket and having lower oppositely bent parallel arms, said parallel arms disposed in side-by-side relationship and terminating in looped portions attached to said arm rest in a manner imposing torsional loading on said main body portion, such loading operating to urge said panel angularly forwardly relative to said arm rest and counter-clockwise about said hinged attachment means.

References Cited in the file of this patent

UNITED STATES PATENTS

| | | |
|---|---|---|
| 1,835,947 | Johannsen | Dec. 8, 1931 |
| 2,561,637 | Rex | July 24, 1951 |
| 2,654,099 | Ake et al. | Oct. 6, 1953 |
| 2,710,049 | Potocnik | June 7, 1955 |
| 2,714,419 | Killington | Aug. 2, 1955 |

FOREIGN PATENTS

| | | |
|---|---|---|
| 327,905 | Great Britain | Apr. 17, 1930 |